UNITED STATES PATENT OFFICE.

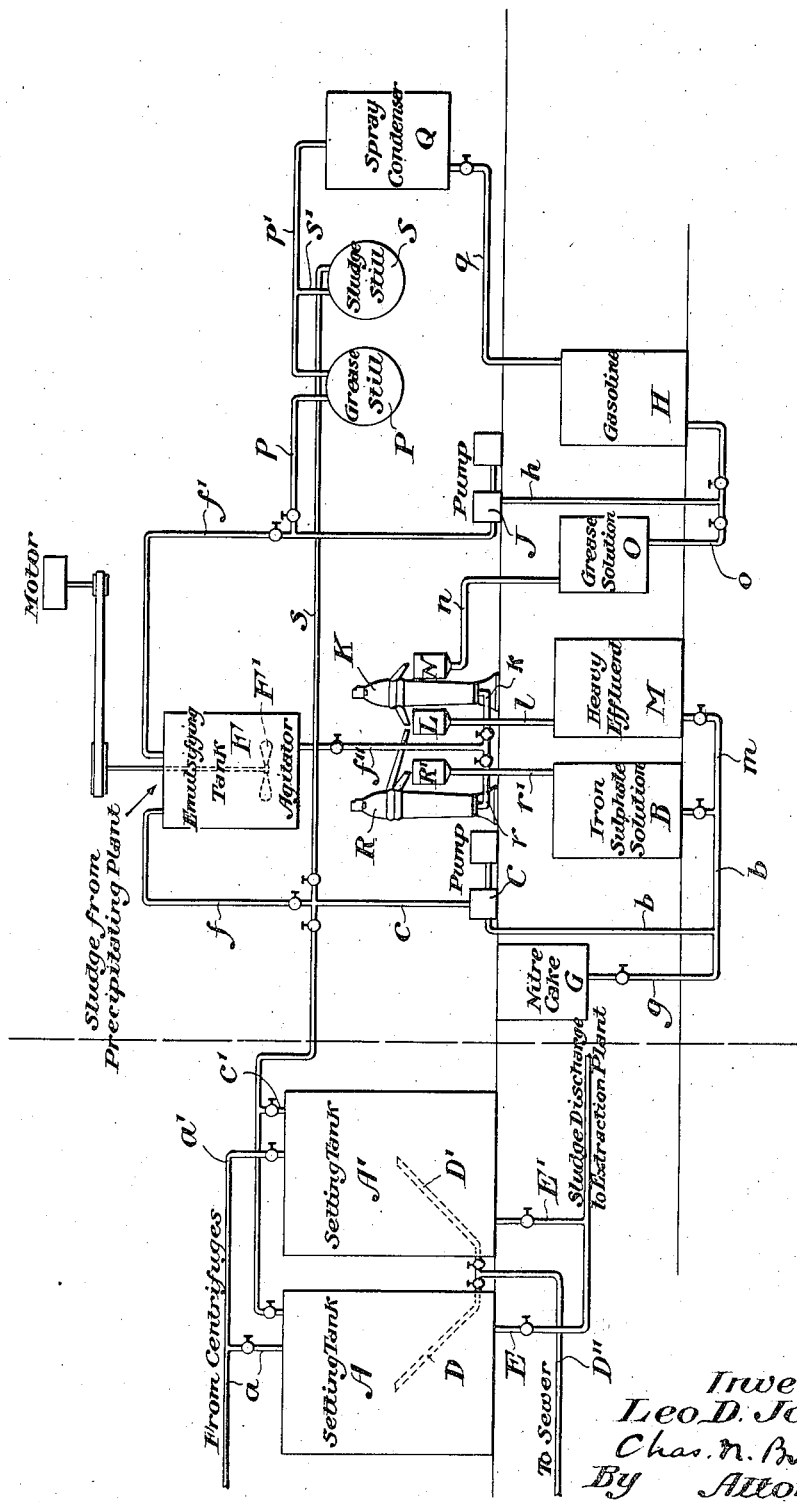

LEO D. JONES, OF PHILADELPHIA, PENNSYLVANIA, ASSIGNOR TO THE SHARPLESS SPECIALTY COMPANY, OF WEST CHESTER, PENNSYLVANIA, A CORPORATION OF PENNSYLVANIA.

PROCESS FOR THE EXTRACTION OF FATTY AND OILY MATTERS FROM WET SLUDGES.

1,328,047.    Specification of Letters Patent.    Patented Jan. 13, 1920.

Application filed December 11, 1918. Serial No. 266,299.

*To all whom it may concern:*

Be it known that I, LEO D. JONES, a citizen of the United States, residing at Philadelphia, in the county of Philadelphia and State of Pennsylvania, have invented Processes for the Extraction of Fatty and Oily Matters from Wet Sludges, of which the following is a specification.

In the recovery of fatty and oily matters from admixtures with aqueous solutions and solid matters, two procedures are common. One is to dry the mixtures thoroughly and then extract with a liquid which acts as a solvent for the fatty and oily matter. The other is to remove as much as possible of the water by filtration, draining or evaporation, and then subject the semi-solid sludge (heated to melt the fatty matter if necessary) to high pressure in specially designed presses, by which a portion of the remaining water and fatty and oily matter is pressed from the sludge. An objection to the first of these procedures is the expense and mechanical difficulty of drying the material. An objection to the second procedure is the expense and labor required for pressing and the very low yield frequently obtained, inasmuch as the final cake from the press retains as high as 20% of the fatty and oily matter.

It is an object of my invention to effect the extraction of such fatty and oily matter efficiently and economically by the use of a solvent lighter than water without first removing the water and with avoidance of the objectionable features of the foregoing procedures.

Previous efforts to remove such fatty and oily matters from mixtures such as are mentioned above by extraction without the removal of the water, have merely resulted in the formation of useless emulsions of the mixture with the solvent used, which emulsions did not separate by gravity at all, or at least so slowly that the procedure was impracticable.

I have discovered that a unique feature of such emulsions is their capacity for separation by centrifugal force with flotation of the solid matter upon the water, for although the density of such solid matter may be greater than that of the water, each particle of the solid is wetted with a film of the solvent used for extraction and the complete particle has a resultant average density less than that of the water.

Since the solid particles are thus rendered lighter than the water, separation of this emulsion can be effected satisfactorily in a centrifuge of the character described in Letters Patent of the United States to Philip T. Sharples, #1232104, dated July 3, 1917, the solid matter being continuously discharged with the water from the periphery of the bowl and the solution of the fatty and oily matter in the solvent being discharged separately from the center of the bowl. The fatty and oily matters are then recovered by distilling off the solvent which is used again in the process.

The process is applicable, for example, to the recovery of grease from the acid sludge from wool scouring liquor, which liquor contains soap and alkalis in solution, and grease and dirt in suspension. If this liquor be allowed to settle, the coarser dirt will fall to the bottom. The supernatant liquid, being separated, is acidified, with acid or niter cake, when the fatty acid in the soap and some organic material soluble in the alkaline solution will precipitate, forming with the fine dirt and suspended grease a semi-liquid sludge.

Heretofore, the procedure has been to drain this sludge upon saw dust beds until it was sufficiently stiff to be wrapped in press cloths, when it was subjected to pressure in hot presses to force out the grease, with a recovery of from 40% to 60% of such grease, the rest of the grease remaining in the press cake. In some cases these press cakes have been dried and extracted with a grease solvent.

The semi-liquid sludge mentioned above may contain approximately 16% of neutral grease and fatty acid, 75% of aqueous solution, and the remainder of insoluble dirt and organic matter.

In accordance with my process, this semi-liquid sludge is diluted with sufficient water to make it thoroughly liquid, so that it will flow freely. A volume of gasolene say equal to the volume of the sludge is now added and the mixture thoroughly agitated with the production of a very permanent emulsion. This emulsion is passed through the solid discharge centrifuge, when say 95% of the gasolene will discharge from the center of the bowl, carrying with it in solution from 85% to 90% of the grease originally present in the sludge, while the aqueous solution and solids together with the remainder of the gasolene will be discharged continuously from the periphery of the bowl. The gasolene solution of the grease is then distilled, when the recovered gasolene distillate can be utilized in the further operation of the process, while the gasolene free grease is deposited in the still as a finished product.

The water and solid discharge from the centrifuge, with the gasolene carried therewith, is heated in a steam still, steam being blown therethrough until all the gasolene has distilled. This gasolene distillate may be returned for further use in carrying on the process, the residue in the still from which it was recovered being discarded.

While my improvements were devised primarily for the purpose of extracting fatty, oily and like matters from wet sludges, it will be understood that they are not limited to such uses and I desire to reserve the right to all uses within the scope of the claims.

The process may be practised by means of the plant illustrated diagrammatically in the accompanying drawing.

The effluent, containing fatty acid in solution as soap and wool grease in the emulsified state, is delivered alternately to the settling tanks A and $A^1$ (each having a capacity of say 2500 gallons) by the conduit $a$ connected directly with the tank A and indirectly by the branch conduit $a^1$ with the tank $A^1$. Preferably during the filling of the settling tank, and starting at the beginning thereof, the calculated quantity of iron sulfate solution, (say 300 gallons), is delivered thereto from the tank B through the conduit $b$ by the pump C and thence through the conduit $c$ directly to the tank A and indirectly through the branch $C^1$ to the tank $A^1$, the introduction of the iron sulfate solution to the settling tank at the beginning of the operation and during the admission of the effluent effecting a thorough mixing. When a settling tank is full, the effluent to be treated is delivered to the other tank and the contents of the full tank are allowed to settle until all the precipitated iron soap and wool grease have collected together in the layer of sludge floating on the surface and the layer of heavy sludge on the bottom of the tank. The intermediate layer of clear water is then drawn off through the swing arm D or $D^1$ discharging through the conduit $D^{11}$ and, following this, the sludge of iron soap, grease and dirt remaining in the settling tank is drawn off through the conduit E or $E^1$ from which it may be delivered to the extracting plant in any suitable manner as by means of barrels.

In the extracting plant, which will ordinarily be installed in a separate building on account of fire hazards, the sludge containing the iron soap and wool grease are put into the emulsifying tank F along with niter cake solution from the tank G which is forced by the pump C through the conduit $g$, $b$, $c$ and $f$ and gasolene from the tank H, forced by the pump J through the pipes $h$ and $f^1$, the emulsifying tank being provided with about equal quantities of sludge and gasolene along with sufficient niter cake solution to entirely liberate the fatty acid in the iron soap in the sludge. The mixture in the emulsifying tank is thoroughly agitated by the agitator $F^1$ and then allowed to settle for a short time, after which it is fed by the pipe $f^{11}$ to the centrifuge K. The centrifuge discharges the heavy effluent into the funnel L whence it is delivered by the conduit $l$ to the tank M; and the light effluent into the funnel N, whence it is delivered by the conduit $n$ to the grease solution tank O.

The light effluent or grease solution, consisting of wool grease and fatty acid in solution with naphtha and comprising the bulk of the grease contained in the sludge, is forced by means of the pump J through the conduits $o$, $h$, $f^1$ and $p$ to the grease still P.

In the grease still P, the gasolene is driven off together with water vapor through the conduit $p^1$ to the condenser Q, where the gasolene and water are condensed and separated, the water being discarded and the gasolene conveyed through the conduit $q$ back to the tank H.

After all the gasolene has been distilled off, the grease remaining in the still P is drawn off, the water being separated therefrom by gravity and the grease thus brought to finished condition.

The heavy effluent in tank M is now forced by the pump C through the conduits $m$, $b$, $c$ and $f$ to the emulsifying tank F and run through a conduit $r$ to a different centrifuge R, by which clear iron sulfate solution is discharged into the funnel $R^1$ and flows thence by gravity through the conduit $r^1$ to the iron sulfate tank B, to be used over again in the process.

The light effluent, which comprises organic impurities and dirt present in the original sludge in a concentrated form, is discharged into the funnel L, whence it flows by gravity through the pipe $l$ into the tank M. The contents of the tank M is forced by the pump C through the conduits $m$, $b$, $c$ and $s$ to the sludge still S, where the removal of any remaining gasolene is effected, the vapors of water and gasolene being conducted through the conduit $s^1$ to condenser Q and the sludge remaining in the still is drawn off.

Having described my invention, I claim:—

1. In the extraction of fatty, oily and like matters from wet sludge, the process which consists in treating said sludge with means for dissolving the matter to be extracted and floating the undissolved material on the aqueous solution, centrifugating the product so as to separate the solution of said matter from the aqueous solution and from the undissolved matter, and floating off said undissolved material.

2. The process of extracting soluble matter contained in wet sludge which consists in rendering such sludge sufficiently liquid to flow through a centrifuge and treating it with a solvent for such matter, said solvent being lighter than the contained matter insoluble therein, and adapted for effecting the flotation of such insoluble matter on the aqueous solution, centrifugating the product so as to separate dissolved matter from the aqueous solution and undissolved matter, discharging the dissolved matter separately from the insoluble matter and the aqueous solution, and separating the solvent from the matter dissolved therein.

3. In the extraction of soluble matter from wet sludge, the process which consists in treating said sludge with a solvent for said matter and rendering remaining undissolved matter capable of flotation in the accompanying aqueous solution, and centrifugating the product so as to discharge the dissolved matter separately from the solid matter and floating off the solid matter by means of the aqueous solution.

4. The process of treating wet sludge containing dissolved soap and alkali together with undissolved grease and refuse, which consists in treating the same so as to precipitate fatty acid, treating the product with a solvent for said grease and fatty acid, centrifugating the product containing the dissolved fatty matter so as to separate the same from water and undissolved solid matter and extracting the dissolved fatty matter from the solvent.

5. The process of treating liquor containing dissolved soap and alkali mixed with undissolved grease and refuse, which consists in precipitating fatty acid from the dissolved soap by acidifying the liquor, treating the product with gasolene so as to dissolve fatty matter and render the refuse floatable on water by centrifugation, centrifugating the gasolene treated product so as to effect the discharge of the bulk of the gasolene and fatty matter separately from the water and refuse and recovering said fatty matter by distilling off said gasolene therefrom.

In testimony whereof I have hereunto set my name this 5 day of Dec., 1918.

LEO D. JONES.